Aug. 15, 1961     C. FELDMAN     2,996,402
METHOD FOR MAKING ZINC SULFIDE LUMINESCENT SCREENS
Filed April 2, 1957
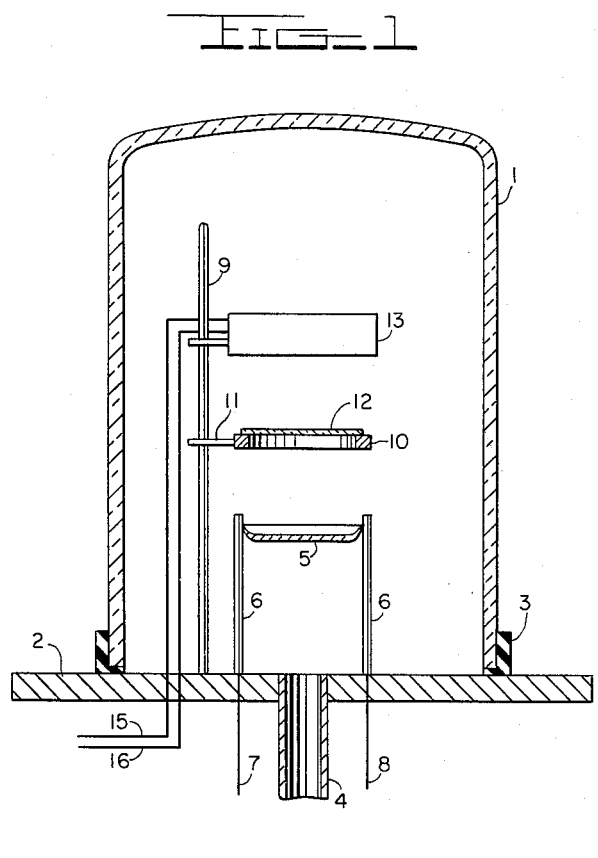
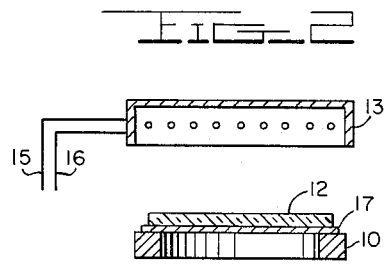
INVENTOR
CHARLES FELDMAN
BY
ATTORNEYS

2,996,402
METHOD FOR MAKING ZINC SULFIDE LUMINESCENT SCREENS

Charles Feldman, Hollin Hills, Va., assignor to Davohn Corporation, a corporation of Delaware
Filed Apr. 2, 1957, Ser. No. 650,284
7 Claims. (Cl. 117—33.5)
(Granted under Title 35, U.S. Code (1952), sec. 266)

The invention described herein may be manufactured and used by or for the Government of the United States of America for governmental purposes without the payment of any royalties thereon or therefor.

This invention relates to the production of luminescent screens for use in cathode ray tubes, more particularly to transparent luminescent screens.

It has been heretofore recognized that drawbacks due to light scattering by powder phosphors in cathode ray tubes can be minimized by the use of transparent luminescent screens in place of the powder phosphors. Thin transparent films of zinc sulfide or of zinc sulfide with manganese activator on a transparent base of glass prepared by the known process in which the zinc sulfide or the same with the manganese activator are evaporated and deposited on the glass within a high vacuum do not luminesce or only feebly so in response to cathode ray bombardment.

It is an object of the present invention to provide a method for producing transparent luminescent screens of activated zinc sulfide.

I have found in accordance with my invention that transparent luminescent activated zinc sulfide screens of a degree of luminescent brightness practical for application in cathode ray tubes can be obtained by depositing a thin film of zinc sulfide on glass or other suitable refractory transparent base by the aforesaid known evaporation-deposition process and subjecting the film containing an activator of luminescence to baking at a temperature within the range of from about 750 to 900° C. for a period of from about 5 to 15 minutes in a high vacuum, i.e., pressures of the order of $10^{-4}$ to $5 \times 10^{-5}$ mm. Hg.

Baking of the thin films of zinc sulfide and activator after they have been deposited on the base or substrate is of great importance. Contrary to an assumption expressed in the literature, the activator is not almost always lost in the evaporation-deposition process, but probably exists mostly as a separate phase in the film. The baking serves two distinct functions, first, it induces good crystallite formation of the zinc sulfide in the otherwise partially amorphous film, and, second it causes the activator (usually manganese) to diffuse into the formed crystallites. Both of these properties are necessary to form luminescent films of good efficiency. The baking activates the films to luminesce in the color characteristic of the activator. Baked films of from about 0.5 to 5 microns thickness of good luminescent efficiency can be prepared by the method.

The baking operation in the method of the invention requires the use of a transparent substrate or base which has a softening point at least as high as the necessary baking temperature. For films of a thickness greater than 0.5 micron, the transparent substrate should have, in addition, as I have found, a coefficient of expansion very close to that of zinc sulfide. Thinner films have less tendency to crack when heated. An experimental glass made by the National Bureau of Standards and designated F–83 meets these requirements. This glass has a deformation temperature of 710° C. but seems to be able to withstand higher temperatures for short periods. It has a coefficient of expansion of $7.1 \times 10^{-6}$ which is approximately that of zinc sulfide which is $6.7 \times 10^{-6}$. With this glass, films thicker than 5 microns can be made and baked without danger of film deterioration.

Transparent luminescent screens produced in the above manner can be heightened in respect to luminescent brightness, as I have found, by giving them a subsequent baking in air at about 500° C. for a short period of time, about 5 to 10 minutes. This baking operation causes oxygen to become diffused in the film whereby increase in the luminescent brightness of the film is developed.

An apparatus suitable for carrying out the method of the invention is illustrated in the accompanying drawing in which:

FIG. 1 is a partly sectional view of the general arrangement of the parts of the apparatus, and FIG. 2 is a partly sectional detail view of the heating element and coated transparent base arranged for baking of the zinc sulfide film.

Referring to FIGURE 1 of the drawing a vacuum cover 1, suitably made of glass, is arranged in vacuum tight relationship on a platform 2 of polished steel by means of a circumferential gasket 3 of heat-resistant rubber (neoprene). A conduit 4 is arranged through the platform 2 for evacuating the vessel 1 by means of a vacuum pump (not shown). A boat-shaped vessel 5 of tantalum or of other electrically conductive refractory material for containing the zinc sulfide and activator to be evaporated is supported by means of a pair of electrically conductive (brass) standards 6. A clamping piece (not shown) is arranged on the upper end of each of the standards 6 for clamping the vessel 5 at its tapered ends to the standards. The standards 6 are attached to the platform 2 in any suitable manner and connected to the electrical leads 7 and 8 from a suitable current source. A metal standard 9 suitably attached to the platform 2 carries a steel ring 10 adjustably mounted thereon by means of a slidable clamping arm 11 extending from the ring. The transparent base or substrate 12 to be coated with the film of activated zinc sulfide rests upon the ring 10.

A radiant heater 13 of conventional design is provided in the vessel 1 for baking the zinc sulfide film in accordance with the method of the invention. The heater is adjustably mounted on the standard 9 by means of a slidable clamping arm 14 and connected by means of the electrical leads 15 and 16 to a suitable current source.

FIGURE 2 is an enlarged view showing the arrangement of the heater 13 positioned to effect baking of the zinc sulfide film on the transparent base or substrate 12 in accordance with the method of the invention. The transparent base 12 is inverted to present the zinc sulfide film directly to the heat radiating from the heater 13. A plate of tantalum 7 or of other metal which is refractory and a good reflector of heat is placed between the transparent base 12 and the ring support 10 for the baking operation. A thermocouple (not shown) is laid on the tantalum plate for measuring the temperature of the baking.

The method of my invention is carried out in the aforedescribed apparatus in the following manner. A quantity of a high grade commercial zinc sulfide-manganese activated phosphor powder, ZnS(Mn) of 2 to 5 mol percent manganese, is placed in the tantalum boat 5. The transparent base or substrate 12 of F-83 glass (above described) is placed on the ring support 10 in position to receive the vaporized material from the boat 5. The vacuum hood or cover 1 is brought down over the substate 12 and boat 5 in vacuum tight relationship with the platform 2 and the resulting vessel evacuated to a pressure of about $5 \times 10^{-5}$ mm. Hg. The substrate 12 is outgassed by heating in the vacuum at about 300 to 500° C. for about thirty minutes to an hour. The necessary heat is delivered by operation of the radiant heater 13. When the substrate 12 has been cleaned in this way, it is cooled in the vacuum to about room temperature. Maintaining the vacuum, the tantalum boat 5 is electrically heated to evaporate the zinc sulfide phosphor powder.

Deposition of the vapor occurs on the under side of the substrate 12. The duration of the evaporation will depend upon the quantity of the material to be evaporated (thickness of the film to be deposited on the substrate 12), the size of the boat 5 and the temperature of the boat. It is recommended that the evaporation be carried out rather slowly for best results in the film. With a tantalum boat at a temperature of about 1050° C., the duration of the evaporation should be about one hour. The temperature of the boat can be determined with an optical pyrometer.

The film thus formed is now baked (fired) in a vacuum of about the same magnitude as above and at a temperature of about 750° to 900° C. for about 5 to 15 minutes. The arrangement for baking of the film is as seen in FIG. 2, the film on the substrate 12 facing the heater 13 and the substrate resting upon the heat-reflecting tantalum plate 17. The unbaked film exhibits a weakly orange luminescence; the baked film a yellow luminescence of good strength. The baking period for the films will depend in general on the thickness of the film and the temperature of the baking, the thinner films and the higher baking temperatures requiring the shorter baking periods.

Comparative measurements of luminescent brightness made on a typical transparent screen produced by the method of my invention and a thin coating of the starting commercial zinc sulfide (Mn) phosphor powder showed a relative luminescent brightness (gun side) in foot lamberts for the transparent film of 20 and for the thin coating of the phosphor powder of 50. Comparative measurements of light transmission for the same showed 89% for the transparent film and 39% for the thin coating of the phosphor powder.

The luminescent brightness of the film of the transparent screens produced as above can be measurably increased, for example, as much as 10 to 50%, by a further baking of the films in air at about 500° C. for a short period of time, about 5 to 10 minutes.

Manganese constitutes the preferred activator in the films of the screens. Instead of being supplied by the use of a commercial zinc sulfide-manganese phosphor powder in making the films, it may be provided by separately and simultaneously vaporizing zinc sulfide and manganese (powder) within the high vacuum in controlled proportions to give the desired film. Suitable proportions of manganese for activation of the films are from about 2 to 5 mol percent. Other activators for the films are silver or copper used in conjunction with a trivalent metal, e.g., aluminum, or with a halogen, e.g., chlorine, as coactivator. The silver and copper and the trivalent metal coactivator are each used in amounts of about .01% by weight. The silver and copper are incorporated in the film in the manner of the manganese, above, by a separate and simultaneous vaporization of the same (powder) and the zinc sulfide. Addition of the trivalent metal coactivator is made to the formed film before the latter is baked, and can be made by vaporizing the metal and depositing the vapor on the formed zinc sulfide film under the high vacuum. In the case of the halogen cotactivator, the addition can be made by exposing the film either before or during the baking period to a flow of the gaseous halogen or of a gaseous hydrohalide, e.g., HCl gas, within the high vacuum. Manganese as activator in the film of the screens, will give a yellow luminescence, silver, a blue luminescence and copper, a green luminescence.

Since the invention may be variously practiced without departing from the spirit or scope thereof, it is to be understood that specific embodiments of the invention appearing in the above description shall be taken as illustrative rather than in limitation except as may be required by the appended claims.

What is claimed is:

1. The method of making a luminescent screen which comprises the steps carried out within a high vacuum of slowly vaporizing zinc sulfide, condensing the vapors on a smooth surface of a refractory base to form a thin film on said base and subjecting said film and base with an activator of luminescence in said film to baking at a temperature between about 750 to 900° C. for a time sufficient to render said film crystalline, transparent and luminescent.

2. The method of making a luminescent screen which comprises the steps carried out within a high vacuum of slowly vaporizing zinc sulfide and an activator of luminescence, condensing the vapors on a transparent refractory base to form a thin film on said base and subjecting said film and base to baking at a temperature between about 750 to 900° C. for a time sufficient to render said film crystalline, transparent and luminescent.

3. The method of making a transparent luminescent screen which comprises the steps carried out within a high vacuum of slowly vaporizing zinc sulfide and an activator of luminescence, condensing the vapors on a transparent refractory base to form a thin film thereon and subjecting said film and base to baking at a temperature between about 750° and 900° C. for a time sufficient to render said film crystalline, transparent and luminescent.

4. The method of making a luminescent screen which comprises the steps carried out within a high vacuum of slowly vaporizing zinc sulfide and an activator of luminescence, condensing the vapors on a transparent refractory base to form a thin film thereon, said transparent base having a coefficient of expansion very close to that of zinc sulfide, and subjecting said film and base to baking at a temperature between about 750° to 900° C. for a time sufficient to render said film crystalline, transparent and luminescent.

5. The method of making a transparent luminescent screen which comprises the steps carried out within a high vacuum of slowly vaporizing zinc sulfide and an activator of luminescence, condensing the vapors on a transparent refractory glass base to form a thin film thereon, said glass base having a coefficient of expansion very close to that of zinc sulfide, and subjecting said film and glass base to baking at a temperature between about 750 to 900° C. for a time sufficient to render said film crystalline, transparent and luminescent.

6. The method of making a luminescent screen which comprises the steps carried out within a high vacuum of slowly vaporizing zinc sulfide and condensing the vapors on a transparent refractory base to form a thin film on said base, subjecting said film and base with an activator of luminescence in said film to baking at a temperature between about 750 to 900° C. for a time sufficient to render said film crystalline, transparent and luminescent, and thereafter subjecting the resulting luminescent screen to baking in air at about 500° C. for a short period of time sufficient to heighten the luminescent brightness of said screen.

7. The method of making a luminescent screen which comprises the steps carried out within a high vacuum of slowly vaporizing zinc sulfide and an activator of luminescence, condensing the vapors on a transparent refractory glass base to form a thin film thereon, said glass base having a coefficient of expansion very close to that of zinc sulfide, and subjecting said film and glass base to baking at a temperature between about 750 and 900° C. for a time sufficient to render said film crystalline, transparent and luminescent, and thereafter subjecting the resulting transparent luminescent screen to baking in air at about 500° C. for a short period of time sufficient to heighten the luminescent brightness of said screen.

References Cited in the file of this patent

UNITED STATES PATENTS

| | | |
|---|---|---|
| 2,571,608 | Plagge | Oct. 16, 1951 |
| 2,685,530 | Cusano et al. | Aug. 3, 1954 |
| 2,600,579 | Ruedy et al. | June 17, 1956 |
| 2,867,541 | Coghill et al. | Jan. 6, 1959 |